(12) United States Patent
Mazzarella et al.

(10) Patent No.: US 9,654,980 B2
(45) Date of Patent: *May 16, 2017

(54) ENABLING EMERGENCY ACCESS TO SECURE WIRELESS COMMUNICATIONS NETWORKS

(71) Applicant: MUTUALINK, INC., Wallingford, CT (US)

(72) Inventors: Joseph R. Mazzarella, Tolland, CT (US); Michael S. Wengrovitz, Concord, CA (US)

(73) Assignee: MUTUALINK, INC., Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/281,904

(22) Filed: Sep. 30, 2016

(65) Prior Publication Data

US 2017/0094524 A1 Mar. 30, 2017

Related U.S. Application Data

(63) Continuation of application No. 15/276,716, filed on Sep. 26, 2016.

(Continued)

(51) Int. Cl.
*H04W 12/08* (2009.01)
*H04W 4/22* (2009.01)
(Continued)

(52) U.S. Cl.
CPC ........ *H04W 12/08* (2013.01); *H04L 63/0281* (2013.01); *H04L 63/0442* (2013.01);
(Continued)

(58) Field of Classification Search
CPC ........ H04W 12/08; H04L 63/10; H04L 67/18; H04L 67/141
See application file for complete search history.

(56) References Cited

U.S. PATENT DOCUMENTS

2006/0149971 A1 7/2006 Kozlay
2009/0132813 A1 5/2009 Schibuk
(Continued)

OTHER PUBLICATIONS

International Search Report and Written Opinion of the International Searching Authority, directed to PCT/US16/53813, mailed Jan. 12, 2017; 12 pages.

(Continued)

*Primary Examiner* — Dao Ho
(74) *Attorney, Agent, or Firm* — Sterne, Kessler, Goldstein & Fox PLLC

(57) ABSTRACT

Embodiments include a system, method, and computer program product for improving public safety communications and real-time information sharing to enable a public safety user to access available, secure private wireless communications (PWC) networks within a vicinity of an emergency for communications and data-sharing purposes. In an embodiment, a universal encryption key (UEK) is stored on a public safety access device. The public safety access device is providing access to a secure PWC network. The UEK is a key established by a certificate authority that enables public safety personnel to access the secure PWC network. Then, a public safety encryption key (PSKey) is received by the public safety access device from a user communication device. The public safety access device enables access for the user communication to access the secure PWC network upon a determination that the received PSKey is associated with the UEK.

25 Claims, 12 Drawing Sheets

Related U.S. Application Data

(60) Provisional application No. 62/308,153, filed on Mar. 14, 2016, provisional application No. 62/308,148, filed on Mar. 14, 2016, provisional application No. 62/308,143, filed on Mar. 14, 2016, provisional application No. 62/232,950, filed on Sep. 25, 2015.

(51) Int. Cl.
| | | |
|---|---|---|
| *H04L 29/06* | (2006.01) | |
| *H04W 12/04* | (2009.01) | |
| *H04W 84/12* | (2009.01) | |

(52) U.S. Cl.
CPC ........ *H04L 63/061* (2013.01); *H04L 63/0807* (2013.01); *H04L 63/0823* (2013.01); *H04L 63/0861* (2013.01); *H04L 63/10* (2013.01); *H04W 4/22* (2013.01); *H04W 12/04* (2013.01); *H04W 84/12* (2013.01)

(56) References Cited

U.S. PATENT DOCUMENTS

| | | |
|---|---|---|
| 2010/0031063 A1 | 2/2010 | Fascenda et al. |
| 2012/0014332 A1 | 1/2012 | Smith et al. |
| 2014/0165160 A1 | 6/2014 | Bae et al. |
| 2014/0187190 A1 | 7/2014 | Schuler et al. |
| 2015/0038103 A1 | 2/2015 | Park et al. |

OTHER PUBLICATIONS

U.S. Appl. No. 15/276,716, filed Sep. 26,2016, entitled "Enabling Emergency Access to Secure Wireless Communications Networks".

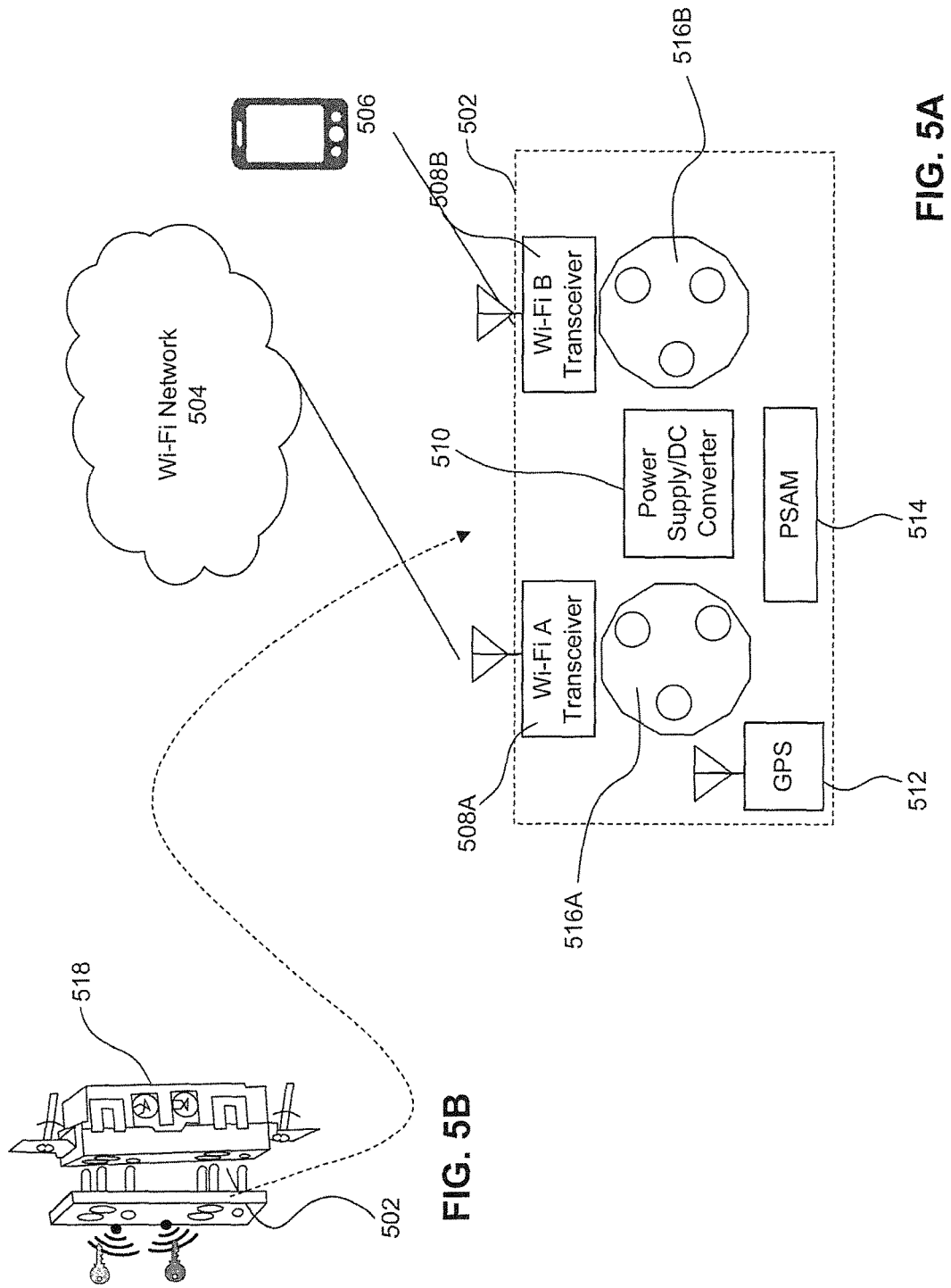

ENABLING EMERGENCY ACCESS TO SECURE WIRELESS COMMUNICATIONS NETWORKS

BACKGROUND

Field

The embodiments generally relate to methods and systems to enable public safety communications. More specifically, the embodiments relate to enabling authorized devices to access secure private or public Wi-Fi networks.

Background

Many times in an emergency, First Responders enter areas where traditional mobile radio coverage is blocked or inadequate, such as in the interior of buildings where walls and other obstructions degrade or act as shields to radio signals. Such situations pose grave danger for First Responders and other persons present because primary communications capability between the First Responder personnel and the command and control points are lost. Additionally, sensors and equipment which rely on network communications or wireless telemetry could be rendered inoperable.

Most commercial and residential buildings set up Wi-Fi networks, intended to provide broadband internet access to occupants within the building. Typically, due to security concerns, Wi-Fi networks are encrypted and require a user device desiring network access to input a valid security key, such as a password, to connect an internet protocol enabled device to access and use the Wi-Fi network of interest.

Many public spaces and private spaces that serve public guests such as hotels, airports, cafes, and transit stations provide Wi-Fi networks that utilize techniques such as Uniform Resource Locator (URL) redirect for devices that request access to the networks. Such networks point a requesting device to a webpage that requires the user to input certain information within a browser before a connection to the public internet can be established through the local Wi-Fi network.

In connection with the growth of broadband access services, public safety personnel, which may be one or more persons, often carry internet-enabled devices such as smartphones and other equipment capable of connecting with local area networks that are interconnected through the Internet. When public safety personnel bring an internet protocol enabled device (IP device) to the scene of a crisis or incident, however, that IP device often cannot connect to the local Wi-Fi networks in the area because the user does not have access to the security access code. Even if the user did, many devices lack a GUI or means to enter an access or security code or the connection becomes cumbersome due to a URL redirect.

Inefficient Portable Communication Networks

A frequent solution to the coverage problem for First Responders' connectivity is the use of portable communications networks, where First Responders bring base stations, access points, or repeaters to the scene of an emergency to extend the coverage of network communications where connectivity is lacking. The portable communications networks, however, become cumbersome because the First Responders often have to spend valuable time to set up and configure the portable communications network. Additionally, the necessary equipment to set up the portable communications network is often not present or in use in other locations. Finally, often there are various sensors within a building environment that may use, in whole or in part, such local wireless networks to transport sensor derived or originated information, such as, and including, video surveillance cameras, smoke and fire detectors, motion detectors, and access control devices. Information generated from such sensors is transported over a private network to local or external private monitoring control points or stations. This information is not readily accessible by first responders on site by access through available private wireless networks due to the same security access constraints.

BRIEF SUMMARY OF THE INVENTION

What are needed are methods and systems that improve public safety communications and real-time information sharing to enable a public safety user access to available public and secure private wireless communications (PWC) networks within a vicinity of an emergency for communications and data sharing purposes. Such methods and systems would allow public safety personnel to communicate, access, and send information through the Internet in areas where traditional communication systems cannot be accessed or do not have coverage. An improved public safety communications and real-time information sharing network would allow any public safety communications device, application, or equipment that is network-enabled to be connected over an available, secure PWC network to the Internet. In the case of non-network enabled devices, such devices can be coupled to a network-enabled IP gateway device, (e.g., a Wi-Fi enabled IP gateway device), which converts device communications to IP and sends such communications via the Internet to network interconnection points, which then decode and retransmit the communications in its original native format as necessary.

Embodiments include methods and systems that enable public safety and other authorized personnel to use IP-enabled devices to automatically obtain on-demand access to public or private wireless communications networks without requiring user input of a security access code or password issued by the PWC network owner, administrator, or authorized agent.

Embodiments employ a universal encryption key (UEK), which is installed on PWC routers and PWC access points, e.g., Wi-Fi routers or Wi-Fi Access Points (WAP), by a certificate authority. Each device carried by an authorized public safety user is loaded with a preconfigured matching encryption key (public safety encryption key). The authorized device may immediately connect to a host PWC network by sending its public safety encryption key (PSKey) when in proximity to the host PWC network or when logically connected to PWC access points.

Further embodiments utilize Smart Repeater Units (SRU), which are small authorized gateway proxy devices that on one side connect to the existing PWC routers and PWC access point infrastructure and on the other side provide key-based wireless access to First Responders. With this embodiment, there would be no need to replace or upgrade existing wireless, e.g., Wi-Fi, network infrastructure. The SRU units can be coupled to existing electrical outlets and the like, or alternatively the SRU device features may be integrated into routers or other similar devices.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 5A is a diagram of the components of a public safety access device, according to an example embodiment.

FIG. 5B is a diagram of a public safety access device, according to an example embodiment.

DETAILED DESCRIPTION

Embodiments include methods and systems for enabling public safety and other authorized personnel IP enabled devices to automatically obtain on-demand access to secure encrypted private or public Wi-Fi networks without requiring user input of a security access code or password issued by the Wi-Fi network owner, administrator, or authorized agent.

Figure 1:
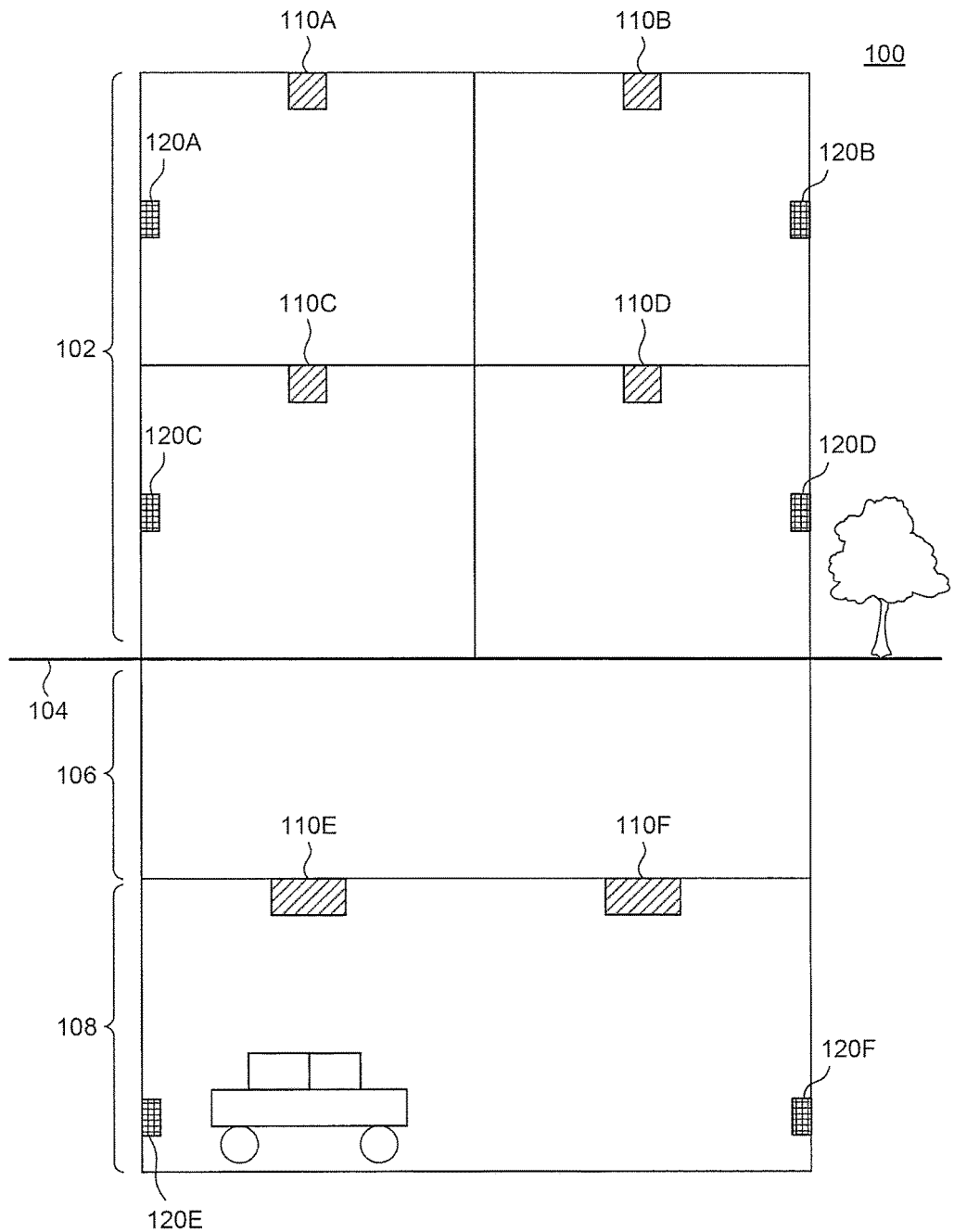
FIG. 1 is a diagram of a building with multiple wireless routers and multiple power outlets, according to an example embodiment.

FIG. 1 is a diagram of a building 100 with multiple wireless routers 110A-F and multiple power outlets 120A-F. Most commercial and residential buildings have a dedicated system of wireless networks supported by an infrastructure of wireless routers 110A-F. A typical building 100 consists of above ground structure 102, ground level structure 104, underground structure 106, and underground parking space 108. The multiple wireless routers 110A-F provide a strong and stable Wi-Fi network throughout the building. The multiple power outlets 120A-F provide a power supply throughout the building. In times of emergency, there is a need for public safety personnel, i.e., one or more persons, to communicate, access, and send information from any location within building 100. Traditional communications systems for public safety personnel have often been insufficient in emergency situations. Such systems may provide adequate communication in the above ground structure 102 and ground level structure 104 of a building, but the connection becomes weak or non-existent in the underground structure 106 and underground parking space 108. Even the adequate communication (e.g., use of emergency personnel radio frequencies or traditional wireless cellular connections) in the above ground structure 102 and ground level structure 104 may not provide sufficient capacity for the needs of public safety personnel in emergency situations.

Figure 2:
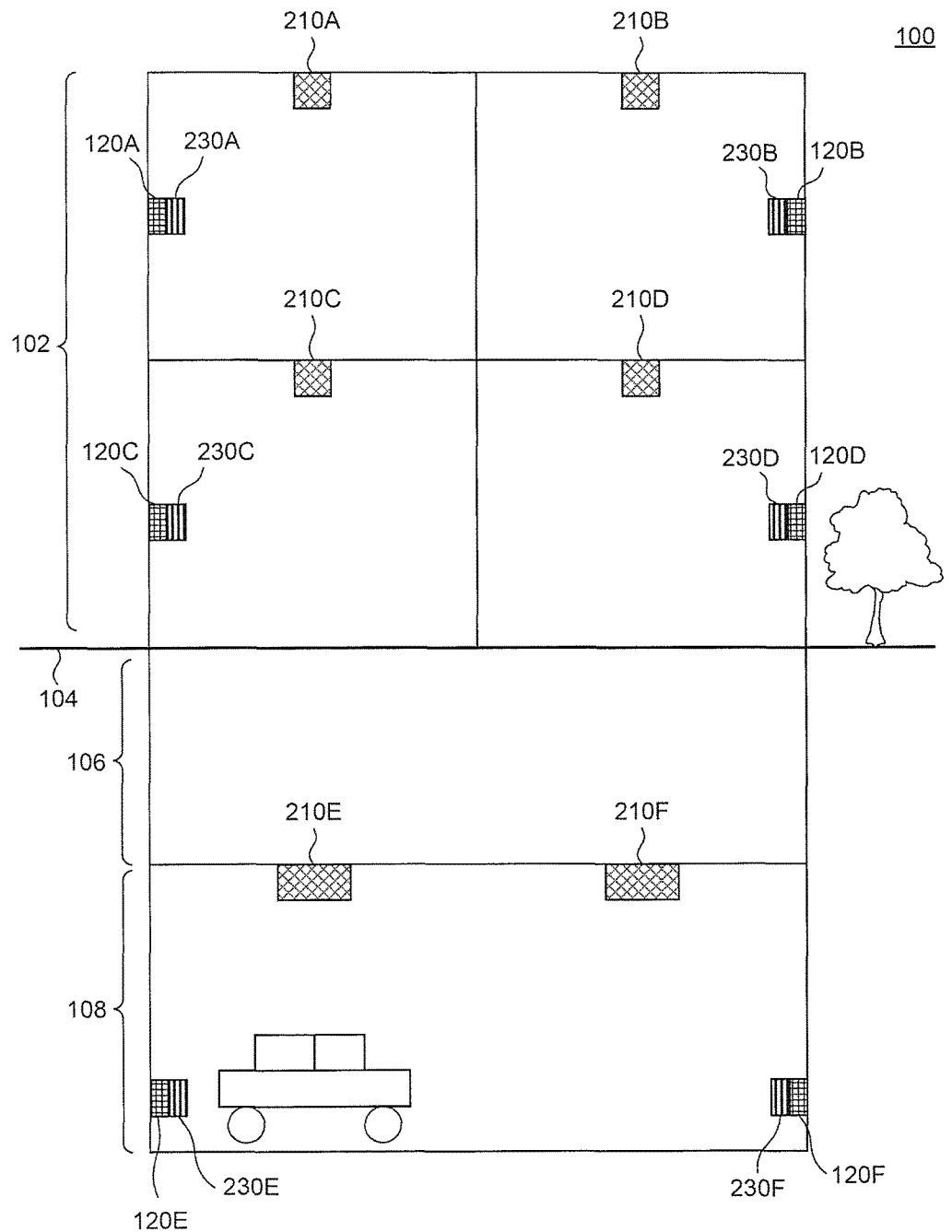
FIG. 2 is a diagram of a building with multiple wireless routers with integrated public safety access modules and multiple power outlets retrofitted with public safety access devices, according to an example embodiment.

FIG. 2 illustrates an example system for configuring and managing public safety access devices, according to an example embodiment. As shown, a building 100 may include multiple wireless routers with integrated public safety access modules (PSAM) 210A-F and multiple power outlets 120A-F retrofitted with smart repeater units (SRUs) 230A-F. The multiple wireless routers with integrated PSAMs 210A-F allow public safety personnel to access existing available Wi-Fi networks within the building 100. Such access to existing available Wi-Fi networks would provide strong and stable communications for public safety personnel throughout the building 100.

In some embodiments, multiple power outlets 120A-F throughout the building 100 are retrofitted with SRUs 230A-F. The SRUs 230A-F are capable of wirelessly connecting authorized devices to existing available Wi-Fi networks within the building 100. The SRUs 230A-F become a gateway for public safety personnel using an authorized device to access existing available Wi-Fi networks within the building for communication in emergency situations. Such access to existing available Wi-Fi networks would provide strong and stable communications for public safety personnel wherever a SRU 230A-F is located in the building. As described above, the existing available Wi-Fi networks may be provided by wireless routers 110A-F or by routers with integrated public safety access modules 210A-F.

Figure 3:
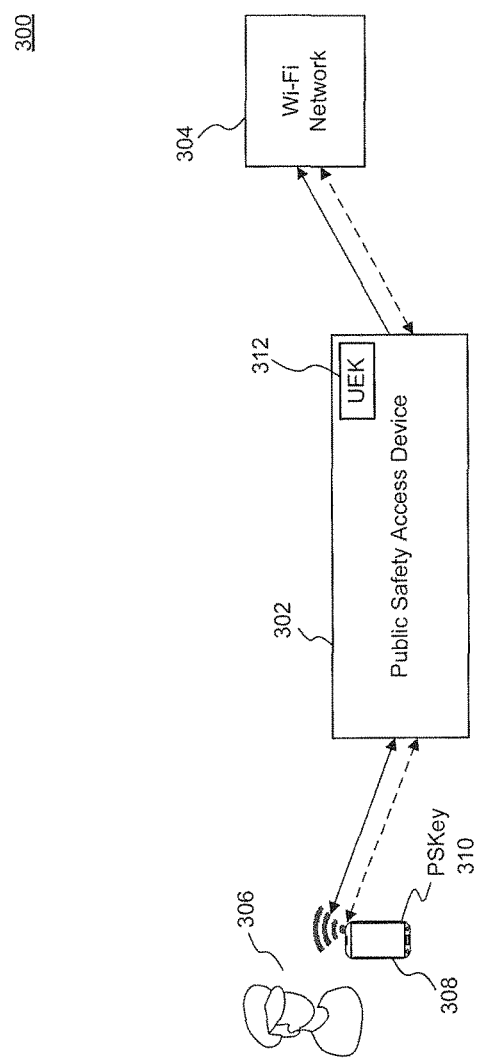
FIG. 3 is a diagram of a public safety access device configured in network-to-network connectivity, according to an example embodiment.

FIG. 3 illustrates an example system 300 of the public safety access device 302 configured in network-to-network connectivity, according to an example embodiment. As shown, system 300 may include authorized public safety user 306 and a wireless device 308 that are associated with the public safety device 302. Authorized public safety user 306 may include public safety personnel such as public safety workers, police officers, firefighters, paramedics, emergency medical technicians, military personnel, armed forces, and intelligence agencies. In an embodiment, an authorized public safety user 306 is a user associated with proper credentials. In some embodiments, these credentials are provided in a physical form, such as in an identification (ID) card, an ID badge, an ID chip installed within a mobile device, an ID device coupled to a mobile device, or a radio-frequency identification (RFID) tag. In some embodiments, these credentials may be provided in a virtual form, such as a username and password pair. To respond to emergencies and communicate effectively amongst each other, authorized public safety user 306 such as first responder may utilize wireless device 308 to access existing available Wi-Fi networks such as Wi-Fi network 304 by establishing network connectivity through the public safety access device 302. Embodiments are not limited to Wi-Fi networks and may be similarly applicable to other private wireless communications networks. Therefore, in some embodiments, Wi-Fi network 304 may represent one or more other private wireless communications networks.

In an embodiment, authorized public safety user 306 communicates with public safety access device 302 using both wireless device 308 and the proper credentials, e.g., an ID badge, to access Wi-Fi network 304. For example, in addition to authorizing the user's wireless device 308 using an authorization key scheme described below, public safety access device 302 may also detect and authenticate the user's credentials. In an embodiment, public safety access device 302 obtains the user's credentials based on a detected ID card, ID badge, ID chip within mobile device 308, an ID device coupled to a mobile device, or other like physical implementations that indicate user credentials. In an embodiment, the user's credentials may have been issued by a central command or agency that also manages the authorization key scheme described below.

In an embodiment, wireless devices 308 may be individual devices that are carried or held by, nearby, or associated with the authorized public safety user 306, and which may operate on different communication interfaces or protocols. Possible protocols may include, but is not limited to, wireless or wired communication protocols such as Wi-Fi, Bluetooth, USB wire, Zigbee, or a proprietary communication protocol.

In an embodiment, the public safety access device 302 can be a wireless router with an integrated PSAM, a wireless access point with an integrated PSAM, or an SRU. Accordingly, the public safety access device 302 may provide the host Wi-Fi network 304 or may be the gateway to a Wi-Fi network 304 provided by a separate wireless router. The system 300 employs an authorization key scheme that includes a universal encryption key (UEK) 312, which is installed on a public safety access device 302 by a certificate authority. A public safety access device 302 is capable of connecting the wireless device 308 to the Wi-Fi network 304 through an IP network. The IP network may be representative of a wired and/or wireless network, and may include any combination of local area networks (LANs), wide area networks (WANs), the Internet, a radio-mobile network like 3G/4G LTE, or a wide area data communications network, etc. In an embodiment, the Wi-Fi network 304 is part of the same network as the IP network provided by public safety access device 302.

Each wireless device 308 carried by an authorized public safety user 306 is loaded with a public safety encryption key (PSKey) 310. When a wireless device 308 is in proximity to a host Wi-Fi network 304, the wireless device 308 may detect the Wi-Fi network 304 and request connection to the Wi-Fi network 304 by transmitting its PSKey 310 to the public safety access device 302. The public safety access device 302 makes the determination as to whether the received PSKey 310 is associated with the UEK 312. The public safety access device 302 allows wireless device 308 to access Wi-Fi network 304 upon determining that the PSKey 310 is associated with the UEK 312.

In an embodiment, there may be a wireless device 308 carried by an authorized public safety user 306 that has not been preloaded with a PSKey 310. In such a case, an administrator may initiate the transmission of access-authorization information to the wireless device 308. For example, an administrator may prompt the public safety access device 302 to transmit a PSKey 310 to the wireless device 308. The PSKey 310 may be transmitted by widely known electronic communication methods such as email, SMS, ftp, and direct application messaging. In another embodiment, the access may be a digital PSKey file, passcode, or key repository address. In some embodiments, PSKey 310 is transmitted to the wireless device 308 directly by the administrator via an IP network such as a radio-mobile network like 3G/4G LTE or a wide area data communications network, etc.

In an embodiment, public safety access device 302 may include one or more Wi-Fi modules to provide the wireless connectivity between a wireless device 308 and a Wi-Fi network 304. As one of ordinary skill in the art will appreciate, Wi-Fi modules of the public safety access device 302 will support the Wi-Fi protocol to enable Wi-Fi communications. When more than one Wi-Fi module is present on the public safety access device 302, each module may operate in different logical network spaces in the same frequency band or operate in different frequency bands in distinct network spaces. In an embodiment, the public safety access device 302 has one Wi-Fi module and there may be two logical networks operating in the same frequency band. In another embodiment, the public safety access device 302 is a multiband Wi-Fi device and has two distinct networks working in distinct frequency bands.

Figure 4:
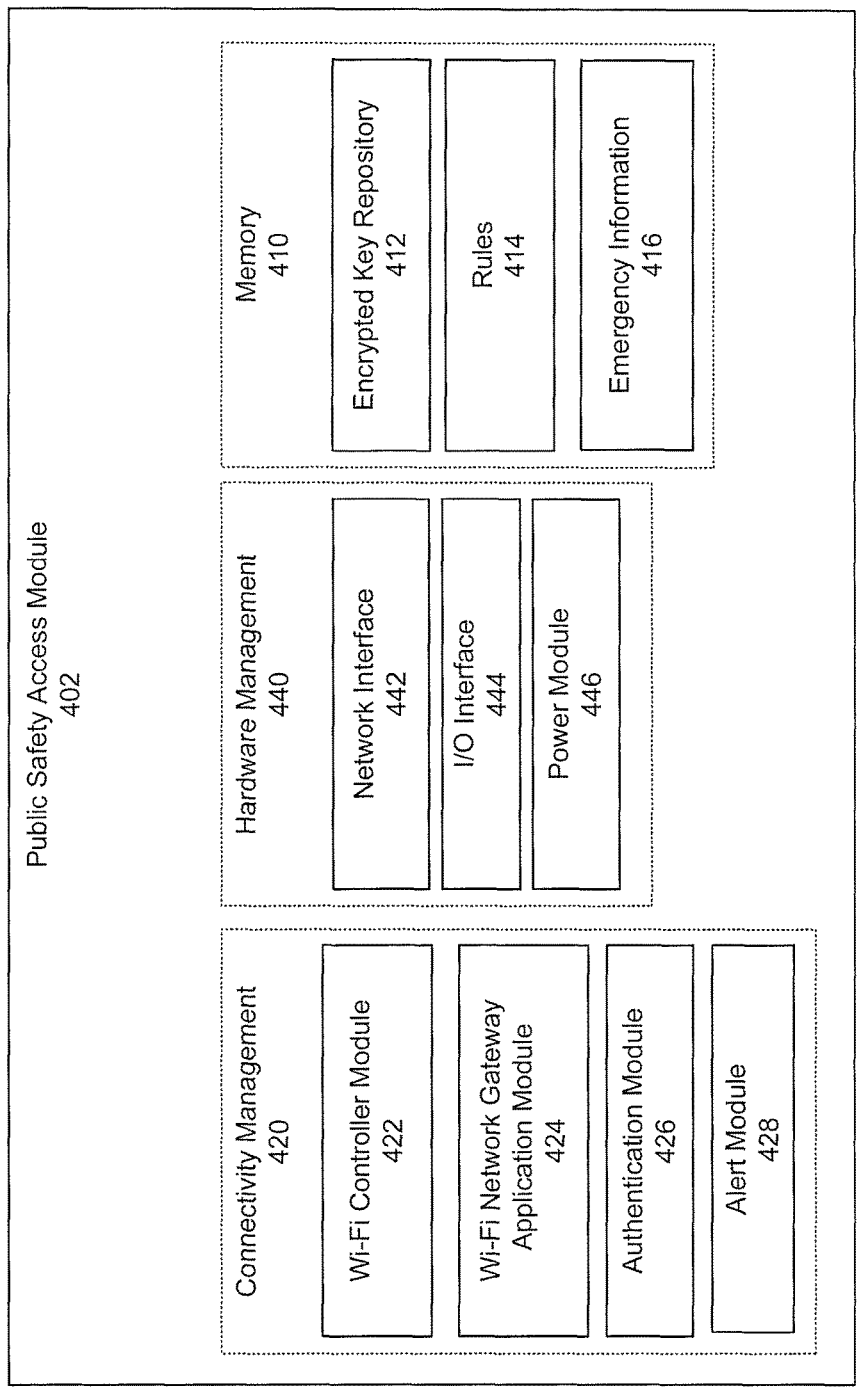
FIG. 4 is a diagram of a public safety access module (PSAM) including various modules, according to an example embodiment.

FIG. 4 is a block diagram of a public safety access module (PSAM) 402 having a flexible software and hardware architecture for enabling a wireless device carried by the authorized public safety user to access secure Wi-Fi networks, according to an embodiment. In an embodiment, PSAM 402 may be integrated in a public safety access device 302 of system 300 from FIG. 3. For ease of understanding, descriptions of FIG. 4 may refer to FIGS. 2-3.

In an embodiment, PSAM 402 may include memory 410 for storing rules 414, emergency information 416, and encrypted key repository 412. Rules 414 may be implemented as a data store of rules and parameters used in connectivity management 420 and hardware management 440. Rules 414 may include default settings or rules and parameters received from authorized public safety user's 306 wireless device 308 through Wi-Fi network 304, physical control, or GUI based application control operated by an administrator.

Encrypted key repository 412 may include encrypted keys, such as the UEK 312 and PSKeys 310. The encrypted key repository 412 stores the UEK 312 and the associated PSKeys 310 that would provide access for authorized public safety users 306 to the Wi-Fi network 304.

Emergency information 416 may include information useful to a public safety user in relation to the host Wi-Fi network 304 such as the Wi-Fi router or access point machine address codes, network addresses or location, network names, and port designations. Emergency information 416 may also include external data or information gathered or measured by wireless devices 308 or other devices that have been communicatively coupled or linked to PSAM 402 or received through Wi-Fi network 304 by modules of connectivity management 420. Such emergency information 416 may include information useful to first responders in emergencies, such as type of facility, number of floors, number of occupants, occupancy birth dates, occupant images, telephone and communications contact information, health information, bedroom locations, utility and infrastructure locations, dangerous materials or conditions present, and physical access points. In an embodiment, present conditions may refer to ambient metrics related to smoke, carbon monoxide, temperature, a light level, humidity, among other types of ambient conditions. Emergency information 416 may also include authorized public safety user identity and authorization information. In an embodiment, database applications are used so that emergency information may be input, stored or updated. In another embodiment, the addresses of authorized public safety user are stored in a database, data file, array or other computer readable data directory which may be input through a GUI based software application coupled to the WAP or a coupled directory application. In another embodiment, various modules may query emergency information 416 against rules 414 to determine whether specific rules or parameters have been met.

In an embodiment, PSAM 402 includes one or more processors for implementing various modules for connectivity management 420 and hardware management 440. A module (or component) of PSAM 402 may include a selection of stored operations that when executing in the one or more processors causes the one or more processors to perform the operations of the module.

In an embodiment, modules for performing hardware management 440 may include network interface 442, I/O interface 444, and power module 446.

Network interface 442 may manage one or more network interface cards (NICs) integrated within the PSAM 402 to provide connectivity to a plurality of public safety access devices 302 operating different network interfaces and protocols. In an embodiment, PSAM 402 may include one or more NICs for supporting one or more of Ethernet, Wi-Fi, Bluetooth, Zigbee, 3G, 4G, LTE, or WiMAX. In some embodiments, the one or more NICs communicatively connects PSAM 402 to one or more sensors, beacons, detectors, and like devices that generate information about ambient conditions. In an embodiment, PSAM 402 may include one or more band class 14 chips to enable connectivity to a public safety network spectrum such as FirstNet. In an embodiment, network interface 442 supporting a band class 14 chip may enable PSAM 402 to act as a hub for other PSAMs 402, public access safety devices 302, or wireless devices 308 to access the public safety network, such as FirstNet.

I/O interface 444 may manage one or more physical ports of PSAM 402. In an embodiment, I/O interface 444 may enable one or more of a universal serial bus (USB) port, an Ethernet port, a serial port, an AC power connection port, or a DC power connection port to be used to charge a battery in PSAM 402. In an embodiment, I/O interface 444 supports an I/O port that enables PSAM 402 to be plugged into a separate device, such as an SRU 230 or a wireless router 210 of FIG. 2. Not only may PSAM 402 be powered based on the coupled device, but also PSAM 402 may leverage processing capabilities of the coupled device using power and IP-over-USB connectivity from the coupled device. In some embodiments, I/O interface 444 may communicatively couple PSAM 402 to one or more sensors, beacons, detectors, and like devices that generate information about ambient conditions. For example, I/O interface 444 may include a USB port or other wired connectors for coupling to a microphone, video camera, or a monitoring system.

Power module 446 may monitor an absolute or relative power level of a battery in PSAM 402 providing charge to PSAM 402. Power module 446 may periodically or continuously store a current power level to emergency information 416 of memory 410. In an embodiment, power module 446 may detect a current power source based on I/O interface 444 and enable the battery to be charged from the current power source.

In an embodiment, modules for performing connectivity management 420 may include Wi-Fi controller module 422, Wi-Fi network gateway application module 424, authentication module 426, and alert module 432. In some embodiments, performing connectivity management 420 is not limited to operating on one or more secure Wi-Fi networks and may similarly operate on other secure private wireless communications (PWC) networks. In such embodiments, modules for performing connectivity management 420 may include, for example, a PWC controller module and a PWC network gateway application module.

Wi-Fi controller module 422 establishes and manages connections with Wi-Fi network 304. The Wi-Fi controller module 422 is configured to control one or more Wi-Fi transceivers. The number and types of Wi-Fi networks controlled may be based on the embodiment of the public safety access device 302. For example, in the case of a wireless router with an integrated PSAM 402, the public safety access device 302 would be controlling one or more Wi-Fi transceivers providing the host Wi-Fi network 304. In another embodiment, an SRU with an integrated PSAM 402 would control one or more Wi-Fi transceivers providing a Wi-Fi network for wireless devices 308. The SRU would control one or more Wi-Fi transceivers to provide a gateway to the host Wi-Fi network 304. As one of ordinary skill in the art will appreciate, Wi-Fi modules of the public safety access device 302 will support the Wi-Fi protocol to enable Wi-Fi communications.

Wi-Fi network gateway application module 424 may be coupled to the Wi-Fi controller module 422 and be configured to manage authorized public safety users 306's access to a secure Wi-Fi network 304. The Wi-Fi network gateway application module 424 may communicate with a host Wi-Fi network 304, via network interface 442, to enable gateway functions for the PSAM 402. The PSAM 402 may allow a wireless device 308 carried by an authorized public safety user 306 to access the host Wi-Fi network 304 by connecting to the PSAM 402 once the authorized public safety user 306 has been authenticated by authentication module 426 described below. In other embodiments, the Wi-Fi network gateway application module 424 may allow public safety access device 302 to communicate, send messages, and transmit data to one or more other public safety access devices in a Wi-Fi network 304. The Wi-Fi network gateway application module 424 allows one or more public safety access devices 302 to serve as the relay gateway to the host Wi-Fi router or WAP. A communications routing protocol among the interconnected public safety access devices 302 may establish which public safety access device 302 will serve as the gateways for the other public safety access devices 302. The protocol may be based on parameters including connectivity to the host router of Wi-Fi network 304 or WAP, data throughput, bit error rates between the public safety access device 302 and the host router or WAP, concurrent use, and other factors.

Authentication module 426 may authenticate whether a person using the wireless device 308 is an authorized public safety user and has permission to communicate with PSAM 402. The authentication module 426 receives a PSKey 310 from the requesting wireless device 308 and compares the received PSKey 310 with the UEK 312 stored in the encrypted key repository 412 and authenticates the user depending on the comparison. For example, if a wireless device 308 transmitted a PSKey 310 and the PSKey 310 is associated with the UEK 312 stored in the encrypted key repository 412, the user would be authenticated.

In an embodiment, the authentication module 408 may request or require certain additional user identity and authorization information to be sent by a requesting wireless device 308 in order to validate the identity of the user of wireless device 308 requesting access to host Wi-Fi network 304. Such additional information can include user name, badge number, agency affiliation, and other identifying and validating information. In an embodiment, the additional information is received from a separate device, module, or application such as a common access card, a personal identification card-reader verification system, a visual or biometric identification system, or a token verification system. In an embodiment, authentication information may be validated, cross checked, or confirmed by a trusted party authentication system. In an embodiment, the authentication module 408 authenticates the user based on detecting proper credentials stored in the user's ID card, ID badge, embedded within a security chip of the user's wireless device 308, among other types of physical storage.

In another embodiment, the authentication module 426 may be coupled to a physical control or GUI based application control connected through the I/O interface 444 to the PSAM 402. The physical control or GUI based application control enables the operator or administrator to allow or disallow public safety user access through a PSKey or otherwise impose access limitation, routing and use rules either locally or through a remote validation service.

Alert module 428 allows immediate access for public safety access users 306 to the secure Wi-Fi network 304 upon receiving an alarm from a monitoring, sensor, or alarm system or service, or a combination thereof. In some embodiments, alert module 428 receives monitored information, sensor information, or alarm information from devices coupled to PSAM 402. These devices may include, for example, sensors, beacons, a panic alarm, video surveillance camera, audio recorder, among other information-gathering devices depending on where PSAM 402 is implemented. For example, a PSAM 402 housed within or coupled to a fire alarm may receive an alarm from a fire alarm if it is activated. In an embodiment, based on the received alarm, alert module 428 activates a public safety mode that enables public safety access users 306 to access the secure Wi-Fi network 304. For example, alert module 428 permits and initiates authentication module 426 to authenticates a public safety user based on whether a PSKey 310, received from wireless device 308, is associated with the UEK 312 stored in the encrypted key repository 412, as described above.

In some embodiments, the alarm received by the alert module 428 is indicated or contained within emergency information received from one or more sensor system or monitoring system alone or in conjunction with an emergency dispatch system or a public safety access point (PSAP), as described below. In some embodiments, the alert module 428 receives the emergency information from a public or wide area emergency notification alone or in conjunction with an emergency dispatch system or a PSAP. In some embodiments, the alarm module 428 receives the emergency information from a panic alarm or a panic alarm system alone or in combination with the PSAP. The alarm, received within the emergency information, associates the emergency with a location in proximity to one of the panic alarm, panic alarm system, an emergency dispatch system, or a public safety access point (PSAP).

In an embodiment, to provide immediate access, alert module 428 may transmit a PSKey to the wireless device 308 of public safety access users 306 listed in the emergency information 416 or otherwise authenticate immediate public safety user and provide access to the secure Wi-Fi network 304. The alert module 428 may allow the wireless device 308 of the public safety access user 306 to immediately connect to a public safety access device 302, host Wi-Fi router, or WAP. In another embodiment a remote service or trusted third party may authenticate public safety user access by transmitting a PSKey or otherwise allow access through the authentication module 426.

In an embodiment, the alert module 428 may receive an alarm message from a public service access point (PSAP) or an emergency dispatch system. In some embodiments, the alert module 428 may receive the alarm system from PSAP alone or in combination with one or more of the monitoring, sensor, or alarm systems or services described above. The alert module 428 allows public safety access user 306 wireless devices 308 to access related Wi-Fi networks 304 provided by the host Wi-Fi router or WAP upon receipt of a notification from PSAP. The Wi-Fi network access enabled for public safety access user 306 wireless devices 308 may be to an existing prescribed Wi-Fi network space such as any Wi-Fi network that is generally used by authorized users of the Wi-Fi network 304.

In an embodiment, the alert module 428 may initiate the employment of a virtual local area network (VLAN) by the connectivity management module 420 to allow public safety access user 306 wireless devices 308 communications and data traffic to be transmitted and received through a logically distinct network space within the Wi-Fi network 304.

In some embodiments, the alert module 428 may initiate the connectivity management module 420 to establish a virtual private network (VPN) between the authorized public safety access user 306 wireless devices 308 and the Wi-Fi network 304, WAP, or other IP network points provided by the host Wi-Fi router. In some embodiments, a WAP router or a gateway coupled to the WAP router may transmit and receive unicast or multicast messages with WAP routers or gateways of other Wi-Fi networks through the Internet or private IP network. In another embodiment, the alert module 428 may access a separate Wi-Fi network designated for public safety access user 306 wireless devices 308.

Another embodiment of the method and system is the Smart Repeater Unit (SRU), which enables public safety and other authorized personnel IP-enabled devices to automatically obtain on-demand access to secure encrypted private or public Wi-Fi networks. FIG. 5A is a diagram of a Smart Repeater Unit (SRU) 502, according to an example embodiment. SRU 502 is a small authorized gateway proxy device that is capable of connecting to an existing host Wi-Fi network 504 provided by a Wi-Fi router or WAP infrastructure through a first Wi-Fi transceiver 508A and also provide key-based wireless access for wireless devices 506 through a second Wi-Fi transceiver 508B. An SRU 502 may contain a power supply 510, a GPS module 512, and a PSAM 514. PSAM 514 includes the capabilities, as discussed previously with respect to FIG. 4. The encrypted keys for the key-based wireless access, such as PSKeys and UEK, are stored in the encrypted key repository 412 of the PSAM 514. With SRUs 502, there is no need to replace or upgrade existing Wi-Fi or wireless infrastructure. SRU 502 is a small electronic computing device with wired or wireless connectivity to an existing Wi-Fi router which can use power ports 516 to be plugged into electrical outlets or other electrical power supplying ports such as light sockets, light ballasts, powered Ethernet and USB ports, alarm panels, charging stations, battery units, batteries, power packs, rechargers, and power strips. In an embodiment, SRU 502 is capable of pairing to host Wi-Fi network 504 by utilizing a first Wi-Fi transceiver 508A and connecting First Responder wireless device 506 through a proxy gateway Wi-Fi network by utilizing a second Wi-Fi transceiver 508B. In some embodiments, Wi-Fi transceivers 508A-B operate within the same frequency band, possibly using the same communication protocols and technologies. In some embodiments, SRU 502 includes a single Wi-Fi transceiver 508 capable of connecting wireless device 506 to Wi-Fi network 504.

FIG. 5B is a diagram of an embodiment of an SRU 502, according to an example embodiment. The SRU 502 is a plug-in device having one or more electrical connectors, e.g., power port 516, that permits coupling to an electrical outlet without preventing use of the electrical outlet. As shown in FIG. 5B, SRU 502 includes power port 516 matching electrical socket receptors that are electrically connected to the host power supplying port 518. One physical design of the SRU 502 is that the power port 516 allows the small device to be plugged into a power supplying port 518 while providing a supplemental power supplying port on the opposite side. By providing the supplemental power supplying port, the SRU power port 516 enables other devices to plug into the power port 516 and receive power via the coupled power supplying port 518.

Figure 5C:
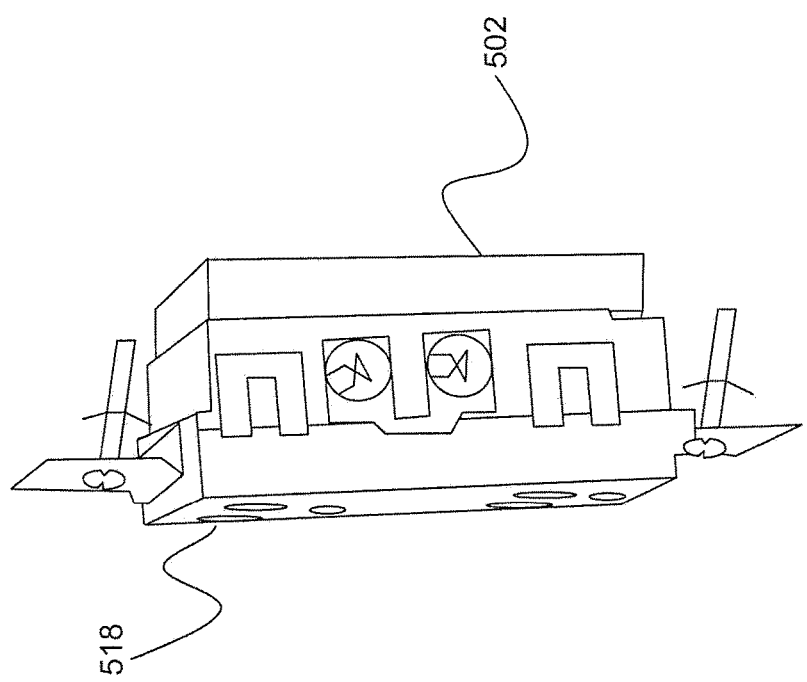
FIG. 5C is a diagram of a public safety access device, according to an example embodiment.

FIG. 5C is a diagram of an SRU 502, according to an example embodiment. SRU 502 is integrated as a component or layer into an electrical receptacle on the back of a power supplying port 518 with power supplied by a common power source.

Figure 6B:
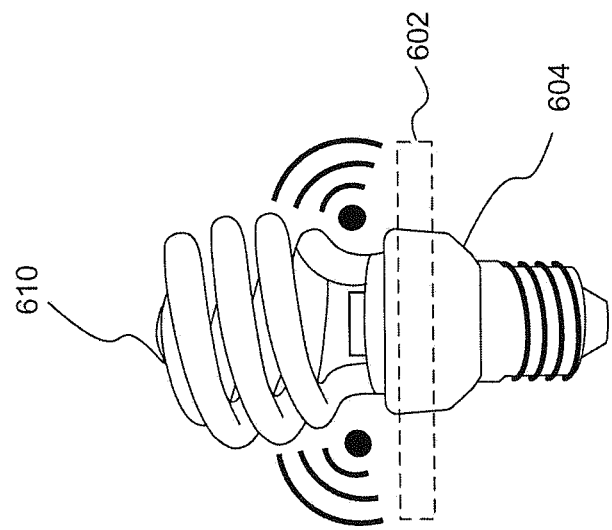
FIG. 6B is diagram of a public safety access device, according to an example embodiment.
Figure 6A:
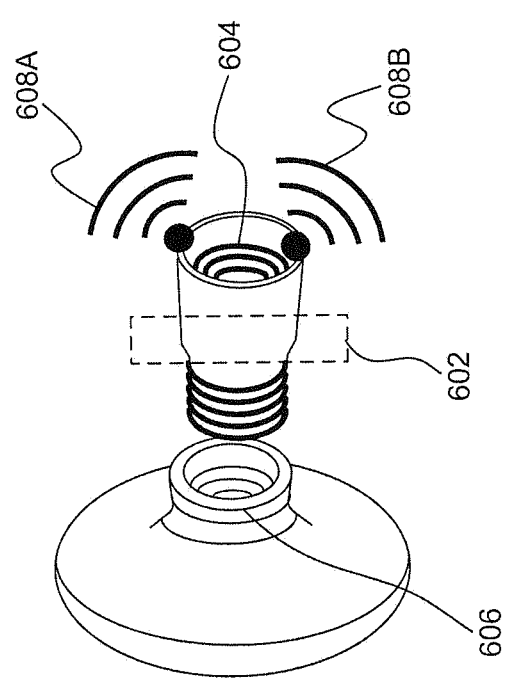
FIG. 6A is diagram of a public safety access device, according to an example embodiment.

FIG. 6A is a diagram of an SRU 602 implemented within a light socket, according to an example embodiment. Particularly, SRU 602 is a small computing chip with Wi-Fi connectivity and a powered light socket 604. The matching powered light socket 604 is matched to an ordinary powered light socket 606. The matching powered light socket 604 is electrically connected to the power source provided to the ordinary powered light socket 606. SRU 602 is capable of pairing to host Wi-Fi network by utilizing a first Wi-Fi transceiver 608A and connecting First Responders through a proxy gateway Wi-Fi network by utilizing a second Wi-Fi transceiver 608B.

FIG. 6B is a diagram of SRU 602, according to an example embodiment. FIG. 6B illustrates how an ordinary light bulb 610 may be plugged into the matching socket receptor 604 associated with the SRU 602.

In some embodiments, SRUs are physically integrated within various types of standalone housings, fixtures, and devices. For example, SRUs may be integrated within or coupled to an key or access control device, a gate control device, a motion sensor, a video surveillance camera, a vibration sensor, a pressure sensor, a chemical sensor, a radiological sensor, a biological sensor, a proximity sensor, a smoke detector, a smoke sensor, a beacons, a temperature sensor, a humidity detector, a carbon monoxide detector, a fire detector, a fire sensor, a fire alarm pull box, an automated external defibrillator (AED) device, lighting fixtures, kitchen fixtures, an emergency sign, an exit sign, a battery pack utilizing the internal power bus, or power distribution system of such devices, or a combination thereof. In an embodiment, a standalone housing may include one or more of each of the aforementioned detectors, sensors, systems, and like devices. In other embodiments, SRUs are coupled to analog switches, digital switches, or other messaging or communications constructs of the host device to enable the communication of the host device's operational state or mode, its current functions and operations, operational parameters or configuration, and resident data through the Wi-Fi network to other computing devices connected to the Wi-Fi network, Internet, or other private IP networks. Such networks are operating software applications or programmatic modules which can read, interpret, process, send queries, and send control messages to the host device.

In other embodiments, SRUs may communicate, send messages, and transmit data to one or more other SRUs in a Wi-Fi network, where one or more SRUs serve as the relay gateway to the host Wi-Fi router or WAP. Transmission and reception of communications from one SRU can be relayed to the Wi-Fi Network router or WAP by another SRU. A communications routing protocol among the interconnected SRUs may establish which SRU will serve as the gateways for the other SRUs. The protocol may be based on parameters including connectivity to the host router of WAP, data throughput, bit error rates between the SRU and the host router or WAP, concurrent use, and other factors. In some embodiments, SRUs are devices that may operate and communicate with other SRUs in a network topology connected to a switch or router. For example, the network topology may be point-to-point, bus, ring or circular, mesh, hybrid mesh, multicast, star, or network-segmented star topology network.

In other embodiments, SRUs are dynamically joined to other SRUs within a network wherein a portable SRU may be dropped, affixed or plugged into a facility or infrastructure. A private-public key exchange is enabled between an existing SRU and portable SRU through Wi-Fi or other wireless or wired electronic communications in order to establish connectivity between an SRU network and a portable SRU.

In other embodiments, portable SRUs have their own battery power. Portable SRUs may be hand carried or affixed or integrated into hand carried or otherwise mobile equipment. Portable SRUs may contain a GPS module 420 in order to obtain the location information to be transmitted to other SRUs and computing device endpoints. In an embodiment, the location information may be displayed on a map GUI display connected to the portable SRU.

In other embodiments, one or more SRUs may be coupled to a multiband radio transceiver, a multiprotocol radio transceiver, or one or more radio transceiver modules capable of sending and receiving voice or data communications over a radio network. In such a radio network, IP messages from the Wi-Fi network will be received by the SRU in IP format and will be transcoded from IP format to a radio network communications compatible format. Messages received from the radio network are similarly transcoded into IP format and transmitted by the SRU through the Wi-Fi network. The SRU serves as the connecting medium between the host Wi-Fi network and radio network in order to couple the radio network to the Internet.

Figure 7:
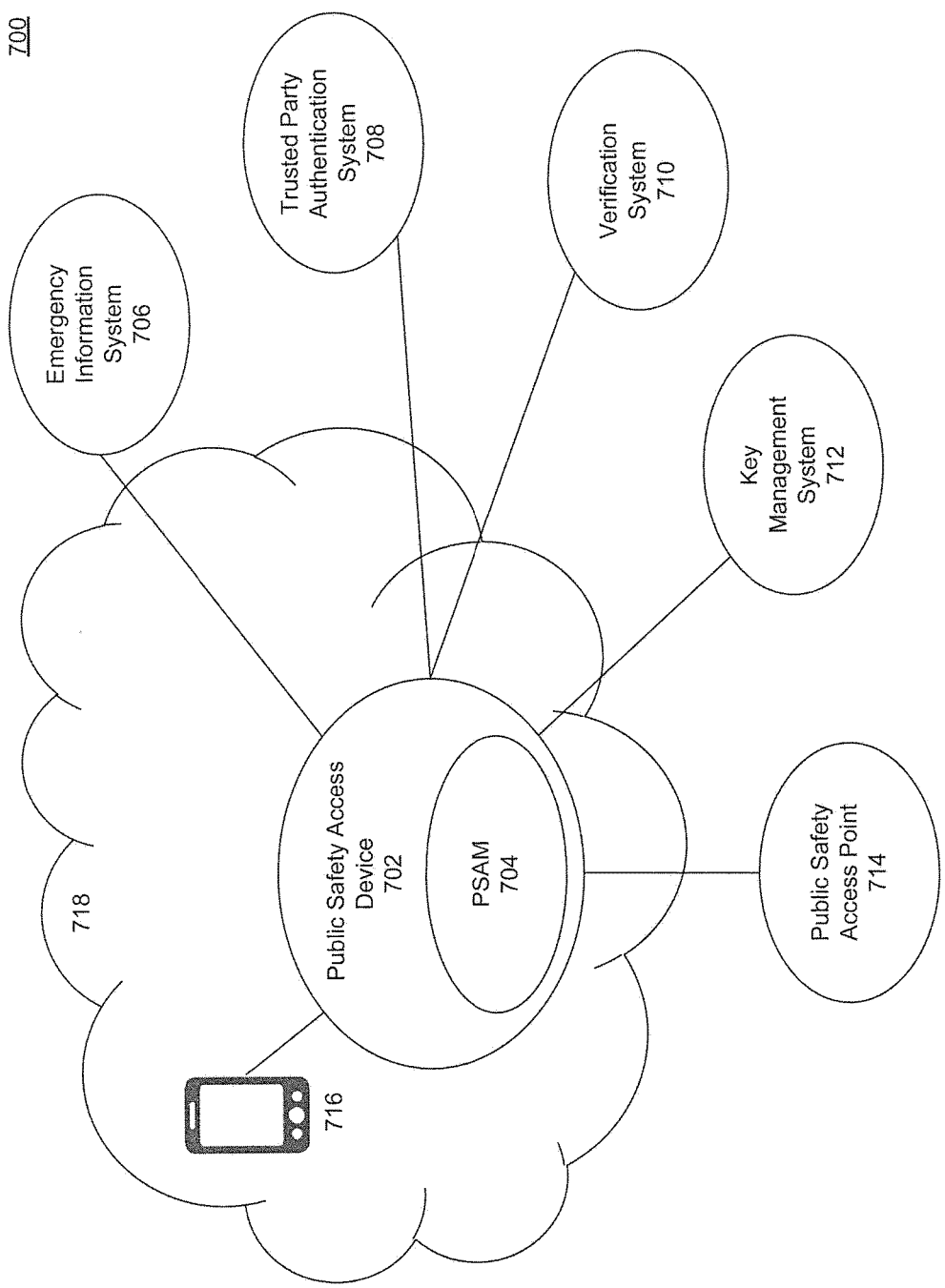
FIG. 7 is a diagram of the system including various modules, according to an example embodiment.

FIG. 7 is a diagram of system 700 including various modules, according to an example embodiment. For ease of understanding, descriptions of FIG. 7 may refer to FIG. 4. The system 700 includes a public safety access device 702, such as a wireless router with an integrated PSAM 704 or an SRU, connected through an IP network 718 to an emergency information system 706, trusted party authentication system 708, verification system 710, key management system 712, public safety access point (PSAP) 714, and a wireless device 716 according to an example embodiment. The IP network may be representative of a wired and/or wireless network, and may include any combination of local area networks (LANs), wide area networks (WANs), the Internet, a radio-mobile network like 3G/4G LTE, or a wide area data communications network, etc. In another embodiment, the system 700 may include one or more wireless devices 716 and one or more public safety access devices 702.

Emergency information system 706 may be a system or database where information relevant to an emergency situation would be stored. Emergency information may include data regarding the public safety access device 702 such as Wi-Fi router address codes, network addresses or location, network names, port designations, and other information useful to First Responders in emergencies. The information in emergency information system 706 would be accessible to wireless devices 716 through the emergency information 416 module in the PSAM 402 memory 410. In an embodiment, the emergency information system 706 would store emergency information for one or more public safety access devices 702 in the proximity and the relevant information useful to first responders in emergencies, such as different types of facilities in the proximity, the number of floors for each specific facility, number of occupants, occupancy birth dates, occupant images, telephone and communications contact information, health information, bedroom locations, utility and infrastructure locations, dangerous materials or conditions present, and physical access points.

Trusted party authentication system 708 allows for additional information to be requested or required to be sent by a requesting wireless device 716 through other validation servers, application services, or application systems operated by a trusted third party. The trusted party authentication system 708 may request or require additional information from: a wireless device 716 that is already connected through a PSKey to the public safety access device 702, or a wireless device 716 that is making the request for connection to the public safety access device 702. An embodiment of additional information requests could be for user identity and authorization information, including information such as user name, badge number, agency affiliation, and other identifying and validating information. Identifying and validating information can be requested or required to be validated, cross checked, and confirmed by the trusted party authentication system 708. In an embodiment, the system 708 would include a common access card or other physical objects, cards, or devices that include proper credentials to authenticate the user operating wireless device 716.

Verification system 710 may allow the system 700 to be coupled to a remote authentication and validation system or third party device such as a common access card (CAC), personal identification verification (PIV) card or other token verification systems. In an embodiment, a card or token may be physically or electronically read by a machine reading device which performs authentication and validation. The authentication and validation can be performed locally or remotely by the trusted party authentication system 708 and may be used in combination or as part of the authentication module 426.

Key management system 712 allows digital encryption keys to be periodically exchanged and updated through a network communications session among various devices including public safety access device 702, PSAM 704, Wi-Fi router, access points, and user client devices 716. In an embodiment, the key management system 712 allows for the delivery of a PSKey upon initiation by an administrator in substitution of a preloaded PSKey. The administrator, which may be human or machine based, initiates a transmission by the public safety access device 702 to transmit access authorization information directly or through other systems coupled to the public safety access device 702 to a public safety user's Wi-Fi enabled client wireless device 716 in the vicinity of the host Wi-Fi network 718. Such access authorization information may include a digital PSKey file, passcode, or key repository address. In an embodiment, the key management system 712, operated by an administrator, generates access-authorization information that the public safety access device 702 receives. In some embodiments, the administrator may base the transmission on identifying parameters such as authorized public safety user's or client devices' agency membership, identity, or credentials. In some embodiments, access-authorization information may be sent through widely known electronic communication methods to the wireless device 708 such as email, SMS, ftp, and direct application messaging.

Public safety access point (PSAP) 714 allows a public safety user immediate access to the relevant local host Wi-Fi network in an emergency. When the PSAP 714 receives a 9-1-1 telephone call or other distress alert or message, a PSKey, password, or authorization command may be sent through a communication network utilizing a module, such as an alert module, operated by the PSAP 714 or third party service to an authentication module coupled to the public safety access device 702, a host Wi-Fi router, or WAP. Subsequently, the public safety access device 702, Wi-Fi router, or WAP activates and provides public safety user wireless device 716 immediate access to the relevant local host Wi-Fi network. In an embodiment, system 700 can be coupled to an emergency dispatch system or other public safety communication or notification system.

Figure 8:
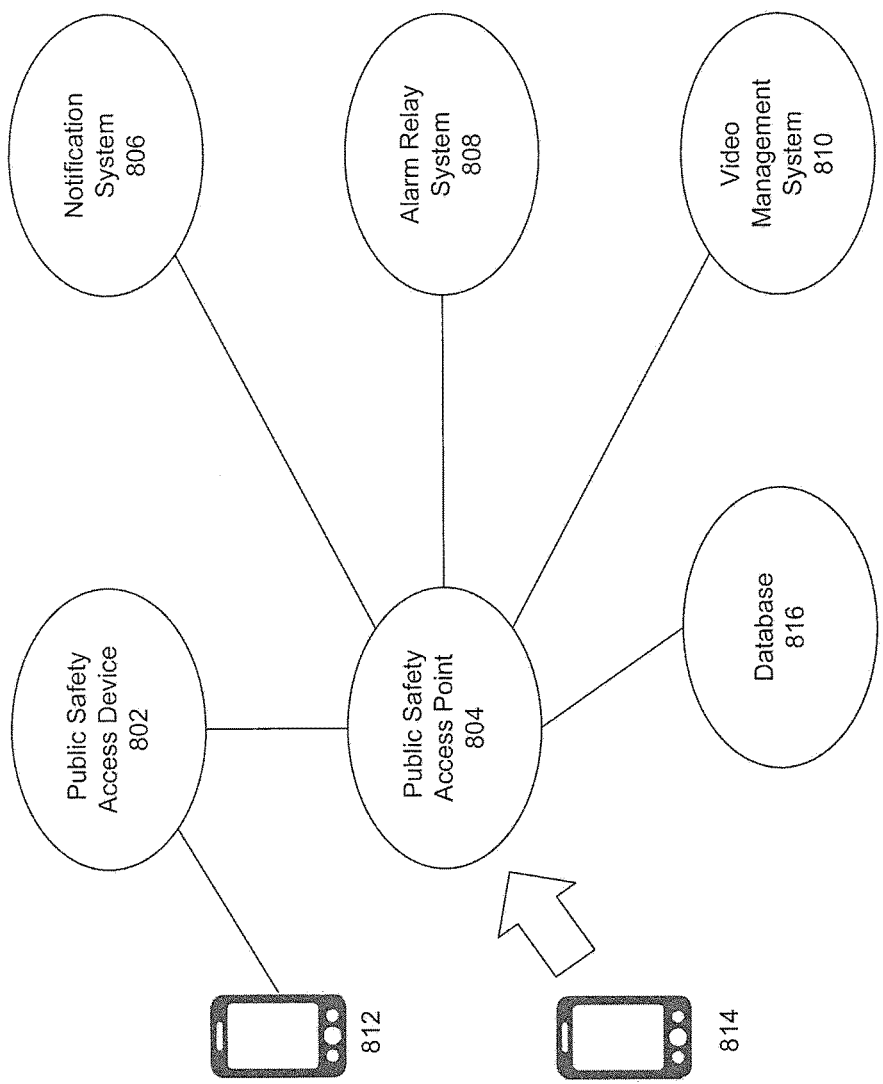
FIG. 8 is a diagram of a public safety access point (PSAP) system including various modules, according to an example embodiment.

FIG. 8 is a diagram of a PSAP system 800 including a PSAP 804 and various other modules, according to an example embodiment. PSAP 804 includes the capabilities, as discussed previously with respect to FIG. 7. In an embodiment, the PSAP 804 receives a 9-1-1 telephone call from an emergency caller 814. The PSAP 804 obtains the location of the telephone call from the originating 9-1-1 telephone number of the emergency caller 814 or the location of the calling device of the emergency caller 814 associated with the 9-1-1 call. The PSAP 804 determines the relevant public safety access device 802, Wi-Fi routers, WAP, and wireless networks by the proximity to the location of the 9-1-1 call. In an embodiment, the PSAP 804 is coupled to a database 816 where information regarding the wireless address accompanied with the location of public safety access devices 802 is stored. The location obtained from the emergency caller 814 may be used to identify an associated public safety access device 802 from the database 816. The PSAP 804 may transmit the PSKey to the associated public safety access device 802, within a threshold proximity of PSAD 802, and allow public safety users operating wireless device 812 to immediately access the relevant local host Wi-Fi network. In an embodiment, upon resolution of the emergency indicated by the 9-1-1 call, the PSAP 804 sends a command to the associated public safety access device 802 or wireless device 812 to delete the PSKey. In an embodiment, implementing this mechanism ensures that public safety users only have access to the PSKey during times of emergency and cannot arbitrarily access any private Wi-Fi networks.

In an embodiment, a notification system 806 coupled to the PSAP 804 may generate or initiate an alert message to a public safety user or other predetermined recipients in relation to the identified public safety access device 802 upon receipt of an emergency condition or 9-1-1 call ("Occupant Emergency Information"). Upon transmission of the PSKey to the associated public safety access device 802, the notification system 806 of the PSAP 804 may receive emergency information from the associated public safety access device 802. The emergency information 416, as discussed previously with respect to FIG. 4, may include information regarding the predetermined recipients and associated recipients in relation to the identified Wi-Fi router. In an embodiment, the alert message contains emergency notification, the emergency condition, and emergency information useful to public safety users. The alert message can be sent to predetermined recipients and associated recipients through a wireless network connected to the PSAP 804. Such wireless network devices may include public safety access device 802, Wi-Fi router, WAP, Wi-Fi repeater, or an application or service coupled to the WAP. The alert message may be in the form of text, visual, or voice message that is sent by telephone chat, SMS, text message, email, social network post, or in-application messaging. In another embodiment, the alert message may be in a data format based on standard format such as an XML standard format or other data formats and that may be visually displayed or depicted by symbols or text on a map, floor plan, or other image.

In another embodiment, an alarm relay system 808 is coupled to the PSAP 804. When a PSAP 804 receives a 9-1-1 call, the alarm relay system stores and transmits an electronic message to a public safety user wireless device 812 connected through the public safety access device 802 associated with the emergency call. In an embodiment, the electronic message indicates that an emergency call event has occurred and may trigger other commands and functions set by predetermined rules for the associated public safety access device 812. Such events may include user access control, alarms, public announcements, mass notification, video management and other similar video surveillance systems.

In another embodiment, a video management system 810 is coupled to the PSAP 804, which allows the public safety user wireless devices 812 to access audio and video views from the emergency location. The video management system 810 sends an audible or visual electronic message through the associated public safety access device 802 to the public safety user wireless device 812 or other predetermined recipient receiving an emergency call, distress message, or alert. In an embodiment, the video management system 810 may send a message to the PSAP 804 containing a hyperlink or URL. The hyperlink or URL may be clicked to open a browser directed to a web page application displaying views captured or transmitted by the video management system 810. The video management system 810 allows the public safety user wireless device 812 to access audio and video views through the PSAP 804 from a surveillance system at the originating emergency location. In another embodiment, the video management system 810 may be established with the PSAP 804 both directly and indirectly through any connected secure local wireless network which has access to the internet or a private IP network. In another embodiment, a software application GUI may display the views captured or transmitted by the video management system 810. In another embodiment, a virtualized instance of the GUI of the video management system 810 may be displayed with views captured or displayed by the video management system 810.

Figure 9:
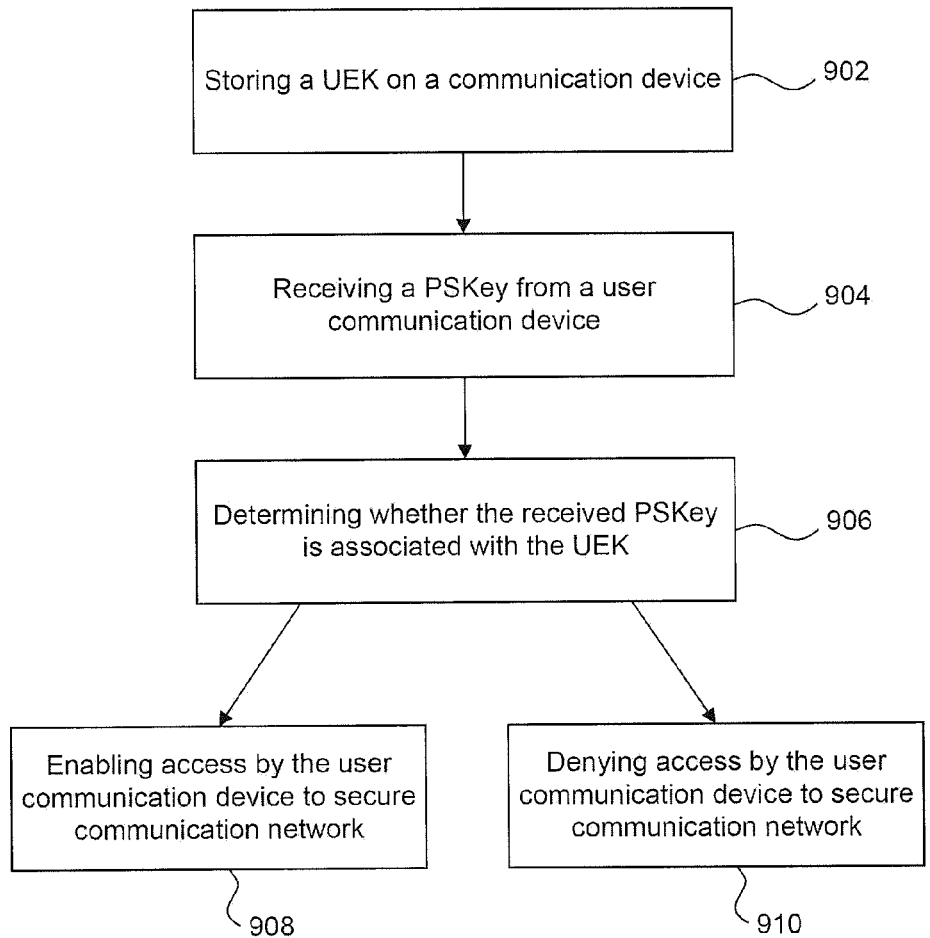
FIG. 9 is a flowchart of a method 900 for enabling a user communication device to access a secure communication network, according to an example embodiment.

FIG. 9 provides a method 900, according to an example embodiment. Method 900 includes steps for enabling user communication devices to access a secure communication, e.g., Wi-Fi, network. Method 900 begins in step 902.

In step 902, a universal encryption key (UEK) is stored on a communication device. For example, the communication device may be a wired or wireless device such as a public safety access device, a smart-repeater unit, or one of various devices with an integrated public safety access module. In some embodiments, the UEK is preconfigured within the communication device. In other embodiments, the UEK is received from a central command or agency system that manages public safety personnel. For example, the central command or agency system may be a certificate authority that establishes the UEK. In an embodiment, the central command or agency system transmits the UEK to the communication device via a communication network such as an IP network. For example, the IP network may be representative of a wired and/or wireless network, and may include any combination of local area networks (LANs), wide area networks (WANs), the Internet, a radio-mobile network like 3G/4G LTE, or a wide area data communications network, etc. The communication device uses the UEK to provide user communication devices access to the secure communication network. The UEK is a key established by a certificate authority that enables public safety personnel to access secure communication networks without knowledge of the private passwords or passcodes set up for local Wi-Fi routers connected to the secure Wi-Fi networks.

In step 904, the communication device receives a PSKey from the user communication device. In step 906 the communication device determines whether the received PSKey of step 904 is associated with the stored UEK.

Following step 906, method 900 proceeds to either step 908 or 910 depending on whether the communication device determines that the PSKey is associated with the stored UEK. In step 908, upon determining that the received PSKey is associated with the UEK, the communication device enables the user communication device to access the secure communication network. In contrast, in step 910, upon determining that the received PSKey is not associated with the UEK, the communication device denies the user communication device from accessing the secure communication network. As described above, in various embodiments, the PSKey is only possessed by or transmitted to user communication devices associated with public safety personnel. This prevents unauthorized users from accessing the secure communication network. In some embodiments, the communication device enables access to the secure communication network based on both the PSKey and the user's ID credentials as detected by an ID card or badge upon other physical security tokens.

Figure 10:
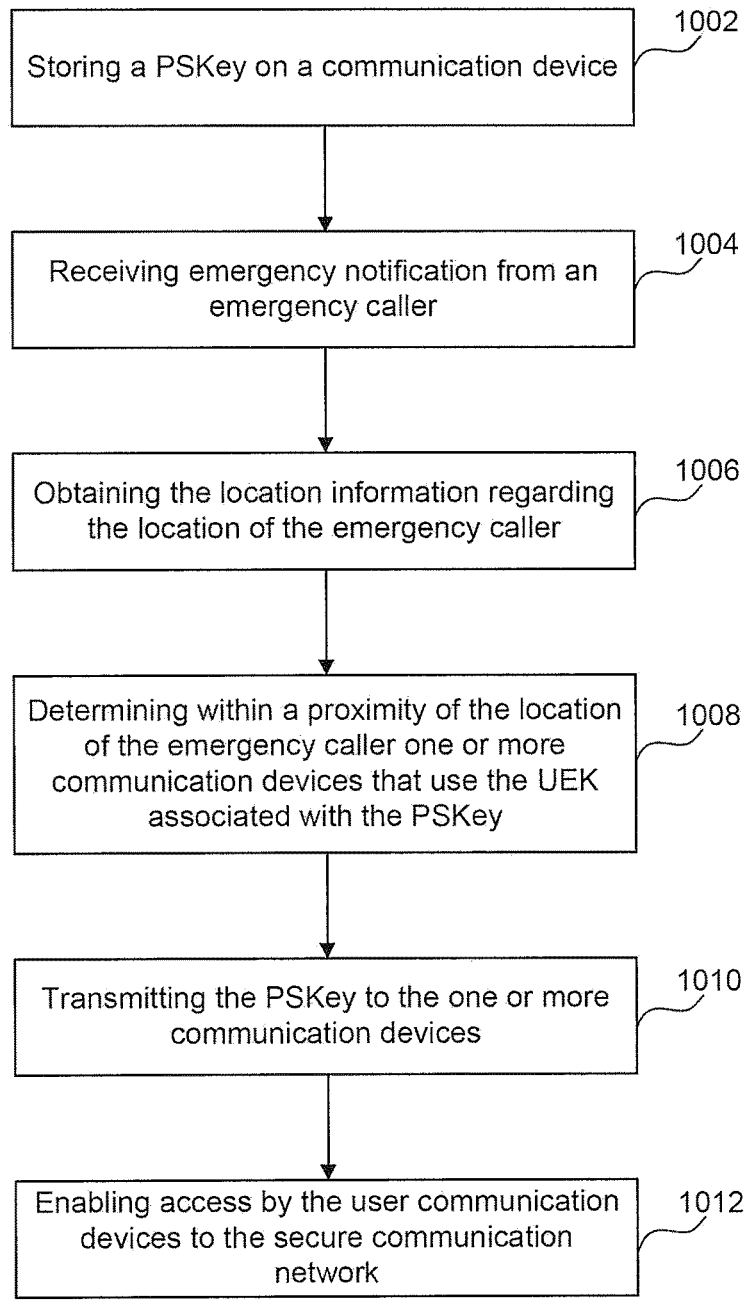
FIG. 10 is a flowchart of a method 1000 for enabling a user communication device to access a secure communication network, according to an example embodiment.

FIG. 10 provides a method 1000, according to an example embodiment. Method 1000 includes steps for enabling user communication devices to access a secure communication, e.g., Wi-Fi, network through a public safety access point (PSAP), such as PSAP 804. Method 1000 begins in step 1002.

In step 1002, a PSKey is stored on a communication device. For example, the communication may be a wired or wireless device such as a public safety access device, a smart-repeater unit, or one of various devices with an integrated public safety access module. The communication device is monitoring for emergency notifications. In some embodiments, the communication device monitors its own coupled sensors, detectors, video camera, audio recorder, or other devices to determine whether an emergency occurs. In some embodiments, the communication device receives an emergency notification from other communication devices, user communication devices, or external systems such as notification system 806 or alarm relay system 808 from FIG. 8. The PSKey is associated with a universal encryption key (UEK), which may be stored on the communication device.

In step 1004, the PSAP receives an emergency notification from an emergency caller. In some embodiments, PSAP receives or detects an emergency based on received sensor or detector information. In step 1006, the PSAP obtains the location information regarding the location of the emergency caller.

In step 1008, the PSAP determines one or more communication devices that use the UEK associated with the PSKey and that are within a proximity of the location of the emergency caller. The one or more communication devices each provide authorized users operating user communication device near one of the wireless communication devices to access a secure communication network.

In step 1010, the PSAP transmits the PSKey to the one or more communication devices. In an embodiment, as described with respect to FIG. 9 above, the one or more communication devices may forward the received PSKey to authorized user's user communication devices proximate to the one or more communication devices.

In step 1012, by transmitting the PSKey, the PSAP enables user communication devices to access the secure communication network. Various embodiments can be implemented, for example, using one or more well-known computer systems, such as computer system 1100 shown in FIG. 11. Computer system 1100 can be any well-known computer capable of performing the functions described herein.

Computer system 1100 includes one or more processors (also called central processing units, or CPUs), such as a processor 1104. Processor 1104 is connected to a communication infrastructure or bus 1106.

One or more processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 may include one or more levels of cache. Main memory 1108 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/ any other computer data storage device. Removable storage drive 1114 reads from and/or writes to removable storage unit 1118 in a well-known manner.

According to an exemplary embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In an embodiment, a tangible apparatus or article of manufacture comprising a tangible computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Figure 11:
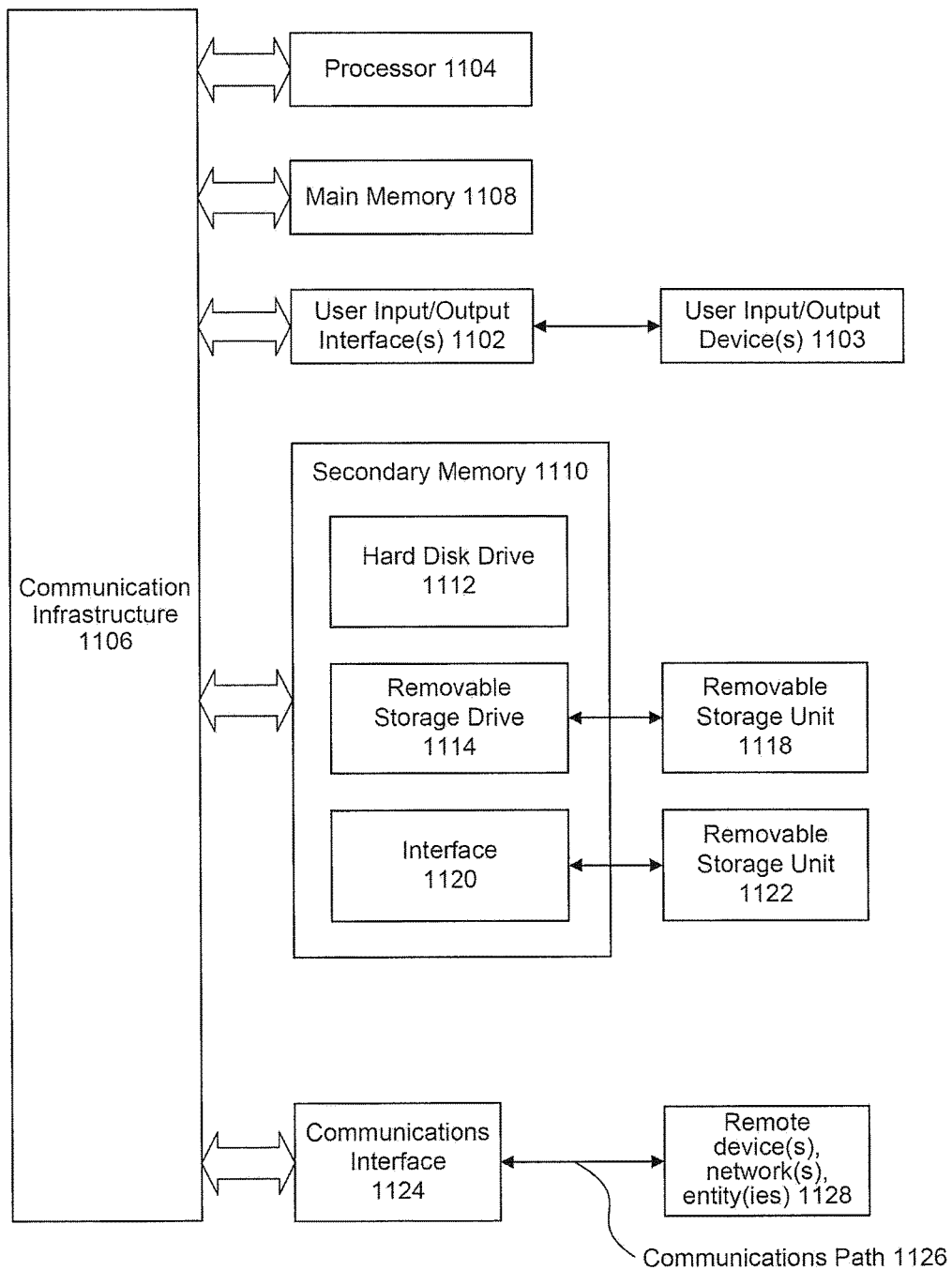
FIG. 11 is an example computer system useful for implementing various embodiments.

Based on the teachings contained in this disclosure, it will be apparent to persons skilled in the relevant art(s) how to make and use embodiments of the invention using data processing devices, computer systems and/or computer architectures other than that shown in FIG. 11. In particular, embodiments may operate with software, hardware, and/or operating system implementations other than those described herein.

CONCLUSION

The described embodiments can be implemented with software, hardware, and operating system implementations other than those described herein. Any software, hardware, and operating system implementations suitable for performing the functions described herein can be used.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

References herein to "one embodiment," "an embodiment," "an example embodiment," "various embodiments," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the present invention should not be limited by any of the above-described exemplary embodiments, but should be defined only in accordance with the following claims and their equivalents.

What is claimed is:

1. A system, comprising:
a memory storing an encrypted key repository that stores a universal encryption key (UEK) and a public safety encryption key (PSKey) associated with the UEK that enables public safety personnel to access a secure private wireless communications (PWC) network, wherein the UEK is a key established by a certificate authority separate from the system;
one or more processors configured to execute a PWC controller module, an authentication module, a PWC network gateway application module, and an alert module;
the PWC controller module configured to control one or more wireless transceivers for accessing the secure PWC network and communicating with a user wireless device of the public safety personnel;
the authentication module coupled to the PWC controller module and configured to determine whether a PSKey received from the user wireless device, via the one or more wireless transceivers, by comparing the received PSKEY to the stored PSKey which is associated with the UEK stored in the encrypted key repository;
the PWC network gateway application module coupled to the PWC controller module and the authentication module, and configured to communicatively connect the user device to the secure PWC network upon a determination that the received PSKey is associated with the stored UEK; and
the alert module configured to activate a public safety mode of the system that initiates authentication procedures to enable the user wireless device to immediately access the secure PWC network upon receiving information indicating an emergency,
wherein the authentication module is further configured to request additional information from a user operating the user wireless device to validate the identity of the user of the user wireless device requesting access to the secure PWC network, and
wherein the additional information is received from a separate device, module, or application comprising a common access card, a personal identification card-reader verification system, a visual or biometric identification system, or a token verification system.

2. The system of claim 1, wherein the PWC network gateway application module is further configured to deny the user wireless device from accessing the secure PWC network upon a determination that the received PSKey is not the PSKey associated with the UEK stored in the encrypted key repository.

3. The system of claim 1, further comprising:
a first wireless transceiver, from the one or more wireless transceivers, capable of connecting to the secure PWC network; and
a second wireless transceiver, from the one or more wireless transceivers, that communicates with the user wireless device in a second PWC network to enable the user wireless device to access the secure PWC network upon determining that the received PSKey is associated with the stored UEK.

4. The system of claim 1, wherein the received emergency information is an alarm message received from an emergency dispatch system or a public safety access point (PSAP).

5. The system of claim 1, wherein the received emergency information is an alarm message received from one or more sensor system or monitoring system.

6. The system of claim 1, wherein the received emergency information is an alarm message received from a public or wide area emergency notification.

7. The system of claim 1, wherein the received emergency information is an alarm message received from a panic alarm or a panic alarm system, wherein the emergency is associated with a location in proximity to one of the panic alarm or system.

8. The system of claim 1, wherein the system is physically integrated within a standalone housing.

9. The system of claim 8, wherein the standalone housing includes one or more devices that monitor ambient conditions, wherein the one or more devices include a sensor or a detector.

10. The system of claim 9, wherein the one or more devices include a smoke detector, a smoke sensor, a temperature sensor, a vibration sensor, a pressure sensor, a motion detector, a video surveillance camera, machine-vision system, pattern-detection system, object-detection system, a fire detector, a fire sensor, a fire alarm pull box, a chemical sensor, a radiological sensor, a biological sensor, a proximity sensor, a gate control device, or a key or access control device.

11. The system of claim 8, wherein the standalone housing includes an electrical connector that couples to an internal power distribution system of a device without preventing the use of the internal power distribution system.

12. The system of claim 8, wherein the standalone housing includes an electrical connector that couples to an electrical outlet.

13. The system of claim 12, wherein the electrical connector permits other devices to access power provided by the electrical outlet.

14. The system of claim 8, wherein the standalone housing is a device that to provide the user wireless device with access to the secure PWC network, communicates data with one or more other devices in one of a mesh, hybrid mesh, multicast, star, or network-segmented star topology network.

15. The system of claim 14, wherein the PWC network gateway application module is further configured to communicate with the one or more other devices to designate a device, in the topology network, to serve as a relay gateway to the secure PWC network for one or more devices in the topology network.

16. The system of claim 15, wherein the designated device is determined based on one or more of a connectivity, data throughput, bit error rate, and concurrent use.

17. The system of claim 1, wherein the secure PWC network comprises a secure Wi-Fi network.

18. A method, comprising:
storing, by a communication device, a universal encryption key (UEK) and a public safety encryption key (PSKey) associated with the UEK in an encrypted key repository, wherein the association enables public safety personnel to access a secure private wireless communications (PWC) network, and the UEK is a key established by a certificate authority separate from the communication device;
receiving, by the communication device, from one or more wireless transceivers, a PSKey from a user wireless device of the public safety personnel;
determining, by the communication device, whether the received PSKey is the stored PSKey associated with the stored UEK;
enabling, by the communication device, the user wireless device to access the secure PWC network through the one or more wireless transceivers upon a determination that the received PSKey is associated with the UEK;
storing, by the communication device, policy rules including parameters that must be met by the user wireless device to enable access of the user wireless device to the secure PWC network; and
upon receiving the PSKey, requesting, by the communication device, additional information from the user wireless device to validate the identity of the user of the user wireless device requesting access to the secure PWC network based on the stored policy rules,
wherein the additional information is received from a separate device, module, or application comprising a common access card, a personal identification card-reader verification system, a visual or biometric identification system, or a token verification system, and wherein the additional information used to validate access comprise one or more of user name, badge number, or agency affiliation.

19. The method of claim 18, further comprising:
denying, by the communication device, the user wireless device from accessing the secure PWC network upon a determination that the received PSKey is not the stored PSKey associated with the stored UEK.

20. The method of claim 19, further comprising:
initiating, by the communication device, authentication procedures to enable the user wireless device to immediately access the secure PWC network upon receiving information indicating an emergency.

21. The method of claim 20, wherein the received emergency information is an alarm message received from an emergency dispatch system or a public safety access point (PSAP).

22. The method of claim 20, wherein the received emergency information is an alarm message received from one or more sensor systems or monitoring systems.

23. The method of claim 18, wherein the communication device is a device that to provide the user wireless device with access to the secure PWC network, communicates data with one or more other devices in one of a mesh, hybrid mesh, multicast, star, or network-segmented star topology network, further comprising:
communicating, by the communication device, with the one or more devices to designate a device, in the topology network, to serve as a relay gateway to the secure PWC network for one or more devices in the topology network.

24. The method of claim 18, wherein the secure PWC network comprises a secure Wi-Fi network.

25. A non-transitory computer-readable device having instructions stored thereon that, when executed by at least one computing device, causes the at least one computing device to perform operations comprising:
storing, by a communication device, a universal encryption key (UEK) and a public safety encryption key (PSKey) associated with the UEK in an encrypted key repository, wherein the association enables public safety personnel to access a secure private wireless communications (PWC) network, and the UEK is a key established by a certificate authority separate from the communication device;
receiving, by the communication device, from one or more wireless transceivers, a PSKey from a user wireless device of the public safety personnel;
determining, by the communication device, whether the received PSKey is the stored PSKey associated with the stored UEK;
enabling, by the communication device, the user wireless device to access the secure PWC network through the one or more wireless transceivers upon a determination that the received PSKey is associated with the UEK;
storing, by the communication device, policy rules including parameters that must be met by the user wireless device to enable access of the user wireless device to the secure PWC network; and
upon receiving the PSKey, requesting, by the communication device, additional information from the user wireless device to validate the identity of the user of the user wireless device requesting access to the secure PWC network based on the stored policy rules,
wherein the additional information is received from a separate device, module, or application comprising a common access card, a personal identification card-reader verification system, a visual or biometric identification system, or a token verification system, and wherein the additional information used to validate access comprise one or more of user name, badge number, or agency affiliation.

* * * * *